(No Model.)

W. W. WINTER & H. DUFFEY.
VEHICLE SPRING.

No. 382,630. Patented May 8, 1888.

Witnesses.
A. Ruppert.
W. K. Nottingham.

Inventor.
W. W. Winter and H. Duffey.
by Nottingham & Suggett.

UNITED STATES PATENT OFFICE.

WILLIAM W. WINTER AND HUGH DUFFEY, OF CORTLAND, NEW YORK.

VEHICLE-SPRING.

SPECIFICATION forming part of Letters Patent No. 382,630, dated May 8, 1888.

Application filed January 14, 1888. Serial No. 260,770. (No model.)

*To all whom it may concern:*

Be it known that we, WILLIAM W. WINTER and HUGH DUFFEY, citizens of the United States, residing at Cortland, in the county of Cortland and State of New York, have invented certain new and useful Improvements in Vehicle-Springs; and we do hereby declare the following to be a full, clear, and exact description of the invention, such as will enable others skilled in the art to which it appertains to make and use the same.

This invention relates to certain improvements in two-wheel vehicles of that class in which the seat is supported above the axle upon vertically-arranged bent springs secured directly to the axle or frame of the vehicle. Heretofore in this class of vehicles the construction and arrangement of the springs have been such that the strain is concentrated or is greater at one or more points than the remaining portions, and not equally distributed throughout. This, it is evident, is disadvantageous, as the springs not only become gradually weakened, but are liable to break at such points and wear much faster than if the strain were distributed uniformly over the whole of the springs, thus impairing the durability of the springs and rendering repairs frequent.

It is the principal object of this invention to obviate these disadvantages, and so construct, attach, and arrange the springs in relation to the seat and axle or vehicle-frame that the strain will be no greater at one point than another, but will be equally distributed throughout the entire length of the spring.

The invention further, however, has for its object to provide for readily and quickly adjusting the springs to the weight upon the seat, so as to conveniently accommodate heavy or light weights, as may be desired, and as more fully hereinafter explained; and the invention still further has for its object to so arrange the details of construction as to provide a compact, easy-riding, and light vehicle, as will hereinafter appear, and be specifically pointed out in the claims.

The above-named objects are obtained by the means illustrated in the accompanying drawings, in which—

Figure 1:
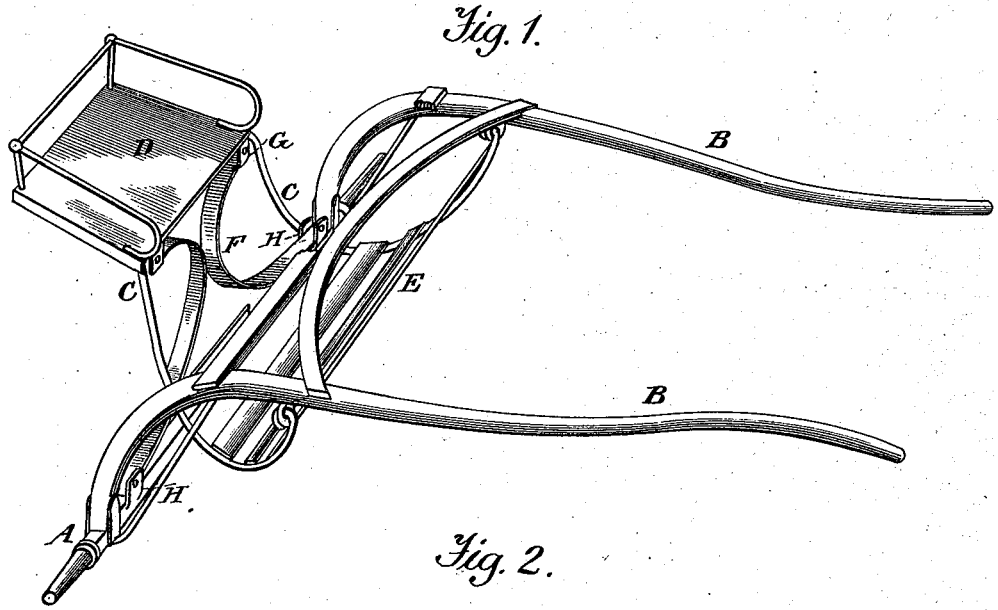
Figure 2:
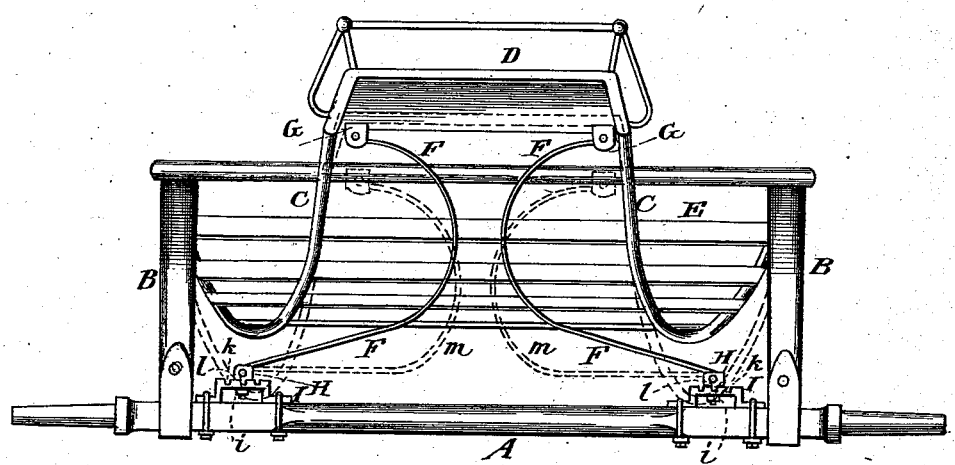
Figure 3:
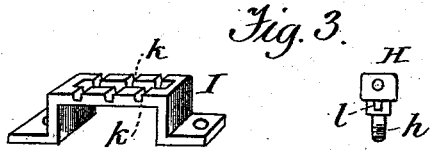

Figure 1 represents a perspective view of the improved springs and their relative arrangement to the other parts of a vehicle; Fig. 2, a rear elevation of the same; Fig. 3, a detail view of the adjusting loop and shackle.

Referring to the drawings, the letter A indicates the axle of a vehicle, and B the shafts thereof, secured in the ordinary manner.

C indicates the seat-frame, which is shackled loosely to the lower part of the shafts B, and curves downward, then backward and upward, where it is bent at an angle to support the seat D. The lower curved portion of the seat-frame is provided with a floor, E, which forms a rest for the feet of the occupant and prevents mud and dirt from being thrown upon the person.

The letter F indicates the springs, which with their connections form the leading feature of this invention. These springs are of the class known as "C-springs," and are located in the present instance directly between the axle and the seat. To the upper ends of the springs the seat is loosely secured by shackles and bolts G or other equivalent means, and the lower ends of the springs are likewise secured to the axle by means of similar bolts and shackles, H. The shackles H are formed with shanks $h$, which are screw-threaded at their lower ends and provided with screw-nuts $i$. The said shanks pass through slots in the bent plates or loops I, the upper faces of which are formed with notches $k$, with which are adapted to engage lugs $l$ on the lower sides of the shoulders of the shackles when in place. By these means the shackles and lower ends of the springs may be adjusted on the axle to or from the ends thereof, so as to change the tension of the springs when desired to accommodate a heavy or a light weight.

When the weight is brought to bear upon the upper ends of the springs, it will be observed that the springs swing at their ends or points of attachment, permitting the strain to be equally distributed throughout the length of the springs between such points, and not concentrating the strain at the point $m$ or bend of the spring, as would be the case if the springs were rigidly attached at their ends.

It will be noticed that the springs bend toward each other, which arrangement has a tendency to further effect the equal distribution of the strain. This will be more readily observed by reference to Fig. 2, in which the action of the springs is illustrated by dotted lines, showing the position which they assume when depressed. By thus distributing the strain the seat will "ride" more comfortably, as all jerky motion will be avoided. By obviating such jerky motion, it will be evident that the vehicle will be much more durable and will be less liable to accident.

Having thus fully described the invention, what we claim, and desire to secure by Letters Patent, is—

1. The combination, with the axle and seat, of the interposed C-springs loosely connected to shackles adjustable in clips secured upon the axle, whereby the springs may be adjusted to accommodate heavy and light weights, substantially as and for the purpose specified.

2. The combination, with the springs and axle, of the shanked shackles having shoulders with projecting lugs, the slotted plates or loops having recesses for the reception of the lugs, and the screw bolts and nuts whereby the shackles may be adjusted, and with them the springs, substantially as and for the purpose specified.

In testimony whereof we affix our signatures in presence of two witnesses.

WM. W. WINTER.
HUGH DUFFEY.

Witnesses:
JOHN W. SUGGETT,
P. J. O'CONNOR.